No. 737,001. PATENTED AUG. 25, 1903.
J. P. MOSKOP.
REVERSING GEAR MECHANISM FOR ENGINES.
APPLICATION FILED MAR. 26, 1903.
NO MODEL.
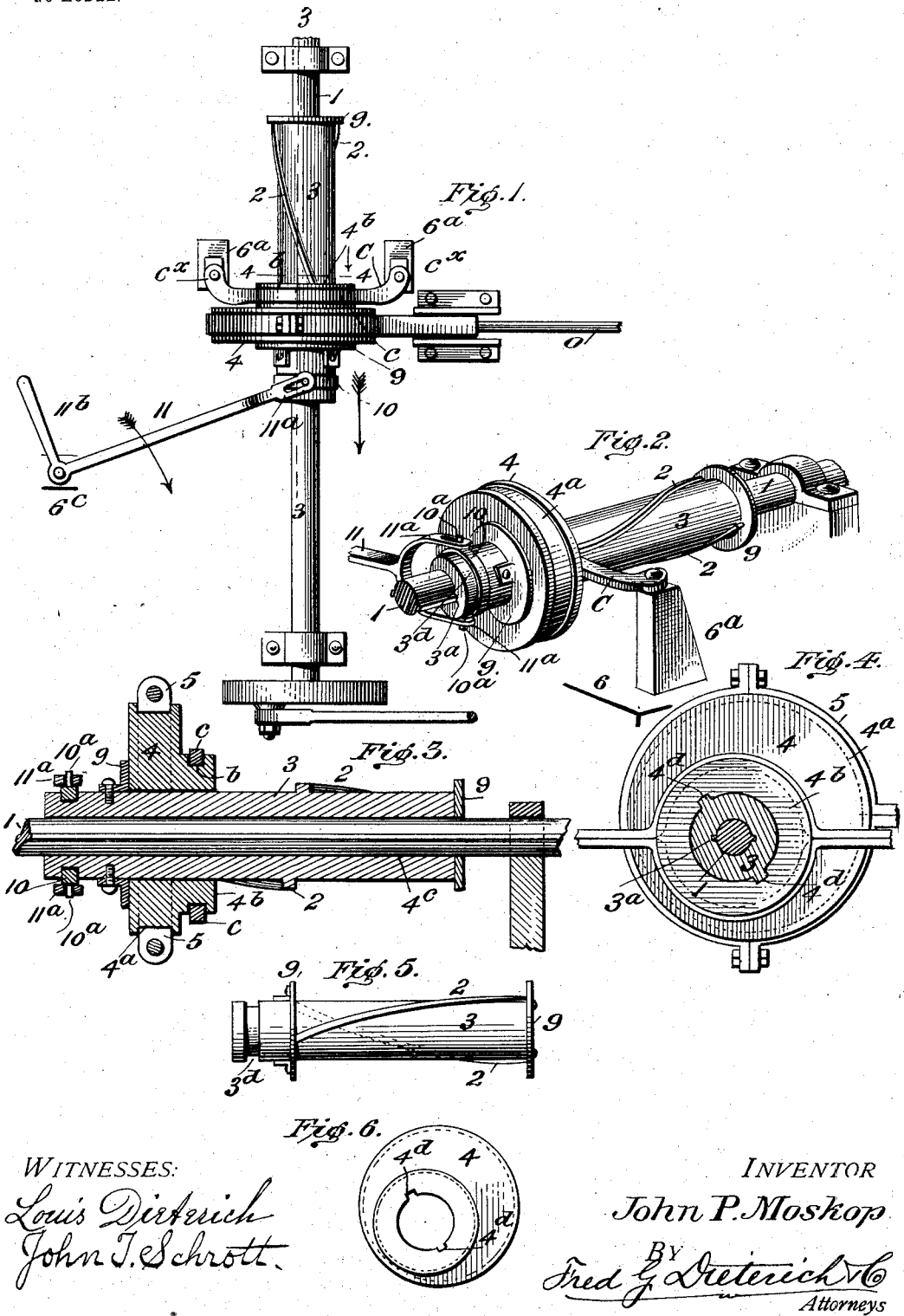
WITNESSES:
Louis Dieterich
John J. Schrott
INVENTOR
John P. Moskop
BY
Fred G. Dieterich & Co.
Attorneys No. 737,001.

Patented August 25, 1903.

UNITED STATES PATENT OFFICE.

JOHN PETER MOSKOP, OF MONROVIA, ILLINOIS.

REVERSING GEAR MECHANISM FOR ENGINES.

SPECIFICATION forming part of Letters Patent No. 737,001, dated August 25, 1903.

Application filed March 26, 1903. Serial No. 149,742. (No model.)

*To all whom it may concern:*

Be it known that I, JOHN PETER MOSKOP, residing at Monrovia, in the county of Monroe and State of Illinois, have invented certain new and useful Improvements in Reversing Gear Mechanism for Engines, of which the following is a specification.

My invention seeks to provide a new and improved construction of gear mechanism for reversing the valves of engines embodying a simple, compact, and economical arrangement of parts especially designed to effect the throw or shifting of an eccentric in a positive and convenient manner; and the same comprehends certain details of construction and peculiar combination of parts, all of which will hereinafter be fully explained and specifically pointed out in the appended claim, reference being had to the accompanying drawings, in which—

Figure 1 is a plan view of my invention as applied for use. Fig. 2 is a perspective view of the reversing mechanism. Fig. 3 is a longitudinal section thereof on the line 3 3 of Fig. 1. Fig. 4 is a cross-section on the line 4 4 of Fig. 1. Fig. 5 is a detail view of the shifting sleeve, and Fig. 6 is a similar view of the eccentric.

In the practical construction the shaft 1 is mounted in any approved manner and carries the usual crank-wheel or disk that joins with the piston-rod, as shown. The shaft 1 has a feather to engage the longitudinal groove $3^a$ in the endwise-slidable sleeve 3, which is mounted on the shaft 1 to rotate therewith.

4 designates the eccentric-disk, which has the usual annular groove $4^a$ to accommodate the strap 5, that joins with the valve-rod $o$ in the usual manner, and at one side it has a laterally-projecting hub $4^b$, whose axis is in alinement with the shaft-aperture $4^c$, which extends through the said hub, as shown. The hub $4^b$ is also provided with an annular groove $b$, with which engages the ring portion $c$ of a bracket C, disposed transversely of the shaft 1, whose inner ends $c^x$ are fixedly connected to standards $6^a$, which project up from the base 6, as shown. The bracket C is provided to hold the eccentric from endwise movement with respect to the shaft. The sleeve 2, which is freely movable in the direction of its length through the eccentric, has fixedly formed thereon or attached thereto a pair of diametrically oppositely disposed spiral flanges $2^c$ $2^c$, that engage with the opposite spiral grooves $4^e$ $4^e$ in the disk-opening, and at its outer ends the said sleeve 2 has annular flanges or rings 9 9, preferably bolted thereto, which serve the double purpose of limiting the throw of the sleeve 2 in reverse directions and for providing side bearings for the eccentric to relieve the bracket 3 from excessive lateral twist strain created by the rotation of the eccentric thereagainst. At one end the sleeve 2 has a clutch-groove $2^d$, adapted to receive a metal ring 10, which has oppositely-projected studs $10^a$ for engaging with the bifurcated end $11^a$ of a shifting lever 11, which extends to within convenient reach of the engineer, is fulcrumed on a bearing $6^c$, and provided with an angle member or handle $11^b$, which may be equipped with the usual spring-pawl devices for engaging with stops to lock the lever in its different adjustments.

From the foregoing description, taken in connection with the drawings, it is believed that the complete construction and operation of my invention will be clearly understood.

It is manifest that when the sleeve is in the position shown in Fig. 1 the movement is imparted to the slide-valve in one direction, and when the said sleeve is shifted to the position shown in dotted lines in Fig. 1 the said slide-valve will have been removed to a reversing position, it being understood that the said slide-valve can be moved more or less, according to the throw or movement imparted to the sleeve 2 through a proper adjustment of the lever 11.

Having thus described my invention, what I claim, and desire to secure by Letters Patent, is—

A combination with a shaft, a cylindrical sleeve rotatable therewith and endwise removable thereon, said sleeve having externally and oppositely disposed spiral flanges running its entire length and the eccentric mounted on the sleeve and having spiral grooves in its opening to engage the aforesaid spiral flanges, and provided with a laterally-projected hub having an annular groove; of a fixedly-held bracket having a ring portion for encircling and engaging the groove in the eccentric-hub, an annular rim mounted upon the shaft and secured to one end of the sleeve and a second annular rim mounted upon and secured to the sleeve near the other end thereof; said annular rims serving to engage the opposite sides of the eccentric-disk when the said sleeve is moved in its alternate direction, said sleeve having a groove in one end, a band for engaging said groove, said band carrying studs, a lever member having a portion for engaging with said studs whereby to shift the sleeve, for the purposes specified.

JOHN PETER MOSKOP.

Witnesses:
WILLIAM KAISER,
JOHN WIERSCH.